United States Patent [19]

French

[11] 4,254,480
[45] Mar. 3, 1981

[54] FREQUENCY INDEPENDENT DIRECTIONALLY SENSITIVE ARRAY IN SEISMIC SURVEYING

[75] Inventor: William S. French, Covington, La.

[73] Assignee: Standard Oil Company (Indiana), Chicago, Ill.

[21] Appl. No.: 941,488

[22] Filed: Sep. 11, 1978

[51] Int. Cl.³ .............................................. G01V 1/30
[52] U.S. Cl. ...................... 367/58; 367/22; 367/23; 367/57; 367/61; 367/62
[58] Field of Search ......... 340/7 R, 15.5 MC, 15.5 F; 181/108, 111, 112; 367/21-23, 43, 45, 58, 61, 62

[56] References Cited

U.S. PATENT DOCUMENTS

| | | |
|---|---|---|
| 2,099,837 | 11/1937 | Blau . |
| 2,544,819 | 3/1951 | Babb et al. .. |
| 3,142,815 | 7/1964 | Picou . |
| 3,274,541 | 9/1966 | Embree . |
| 3,284,763 | 11/1966 | Burg et al. . |
| 3,335,401 | 8/1967 | Kerns . |
| 3,350,683 | 10/1967 | Sengbush . |
| 3,381,266 | 4/1968 | Harris .......................... 340/15.5 MC |
| 3,491,848 | 1/1970 | Giles . |
| 3,564,494 | 2/1971 | Frasier et al. . |
| 3,572,462 | 3/1971 | Gray . |
| 3,893,066 | 7/1975 | Saunders ...................... 340/15.5 GC |
| 3,943,484 | 3/1976 | Balderson ..................... 340/7 R |
| 3,952,281 | 4/1976 | Parrack ......................... 340/7 R |
| 3,979,713 | 9/1976 | Parrack ......................... 340/7 R |
| 4,136,754 | 1/1979 | Manin ........................... 181/111 |
| 4,146,870 | 3/1979 | Ruehle .......................... 340/7 R |

OTHER PUBLICATIONS

"Les Filtres En Eventail", Fail et al., *Geophysical Prospecting* vol. XI, 1963, pp. 131-163.
"Wide-Band Velocity Filtering-the Pie Slice Process", Embree et al., *Geophysics*, vol. 28, No. 6, Dec. 1963, pp. 948-974.
"Some Aspects of Fan Filtering", Treitel et al., *Geophysics*, vol. 32, Oct. 1967, pp. 789-800.

*Primary Examiner*—Howard A. Birmiel
*Attorney, Agent, or Firm*—James H. Dautremont

[57] ABSTRACT

A novel array of vertically and horizontally spaced hydrophones is shown which is capable of high ratio of desired signal to noise because of good directional sensitivity when used with any seismic source. Alternatively, a novel directionally sensitive array of vertically and horizontally spaced seismic sources is disclosed for use in seismic surveying with any spread of hydrophones or geophones, again attaining a high ratio of desired signal to noise. A reception pattern (in the first case) and a radiation pattern (in the second place) is produced which essentially eliminates reception or radiation at all frequencies except for waves within a predetermined angle with respect to the array. The sensitivity is essentially constant within such angle for all frequencies and essentially zero outside it. This permits the array geometry to be adjusted so that there is high attenuation of undesired seismic waves, whether these be due to noise or other random waves, or are signal-generated waves from the seismic source but traveling in an undesired direction.

8 Claims, 8 Drawing Figures

FREQUENCY INDEPENDENT DIRECTIONALLY SENSITIVE ARRAY IN SEISMIC SURVEYING

BACKGROUND OF THE INVENTION

This invention relates to seismic reflection exploration methods and is particularly adapted for (though not restricted to) use in such exploration under water, i.e. marine seismic exploration.

Such exploration involves the collection of data (arrival times of seismic wave trains) which define subsurface geological formations, due to reflections of seismic (sound) waves from such formations. It is well known that such data are obtained by producing a seismic disturbance at a source, for example, by detonating a charge of explosive, dropping a weight, actuating a vibrator, etc., and recording the resultant reflected seismic waves arriving at a plurality of receptors (a kind of microphone). Unfortunately, such waves are not the only waves produced; in fact, there are both random waves caused by wind, traffic or the like, and unwanted waves due to the production of the seismic disturbance (called source-generated waves) which interfere with reception of the desired reflections. A wide variety of methods have been produced for minimizing the reception of the undesired waves compared to those from the reflecting horizons. In fact, it has been made possible through various arrays of equipment and also through processing the data, for example, through large scale computers, to produce resultant records with the desired waves enhanced compared to all of the others present.

The current invention involves the use of arrays either for receiving seismic waves directionally at desired angles compared to the array, or as a source for producing seismic waves directionally in configurations which tend to minimize undesired waves. These directional responses are substantially the same for all seismic frequencies.

The first publication relating to this particular type of technique is an article by Fail and Grau, "Les Filtres en Eventail", Geophysical Prospecting Vol. 11 (1963) pp. 131–163. This was followed by: Embree, Burg and Backus "Wide-Band Velocity Filtering—The Pie Slice Process", Geophysics Vol. 28 (1963) pp. 948–974, and Treitel, Shanks and Frasier, "Some Aspects of Fan Filtering", Geophysics Vol. 32 (1967) pp. 789–800.

PRIOR PATENTS

A patent which teaches functionally how to accomplish the same objectives as this invention, but by record processing techniques operating on reproducible recordings rather than by the use of arrays is the Embree U.S. Pat. No. 3,274,541 filed Feb. 15, 1963. The process outlined in the patent essentially is equivalent to that found in the Embree, Burg and Backus article mentioned above. In this arrangement, multi-channel data are obtained conventionally on reproducible recordings which are processed prior to compositing the data. The data received at individual geophones in a group are multiplied by an appropriate weighting function, the phase adjusted, and a time advance or time delay introduced, depending upon the location of the trace relative to adjacent traces. After this, the resultant data of many seismometer groups are composited to produce records in which there is high attenuation for waves except for those coming within a certain "fan" or angle with respect to the vertical. Within the fan angle, the recording sensitivity is essentially the same regardless of angle of incidence of the reflected waves; outside it sensitivity is reduced at least 20 db.

One of the very early patents dealing with the minimization of horizontally traveling noise waves compared to desired reflections was the O. H. Truman U.S. Pat. No. 1,919,917, filed Jan. 22, 1929. Results were obtained using either two simultaneously energized shot points or connecting two adjacent geophones additively, the shot points or the distance between geophones being chosen to be an integral multiple of ½ wavelength of the horizontally traveling noise waves. This, Truman taught, cancelled the noise waves while reinforcing the reception of waves perpendicular to either the direction of the two shot points or the direction of the geophone spread but, unfortunately the effectiveness of this technique varies with frequency. A few years later, L. W. Blau in U.S. Pat. No. 2,099,837 (filed Dec. 30, 1933) emphasized the reception of desired waves by burying a spread of geophones at different depths below the surface of the earth so that the geophones are essentially on the arc of a circle with its center at a point which is the mirror image of the actual shot point with respect to the reflecting bed. A similar arrangement of shot points could be similarly used with individual geophones or a spread. The geophones were additively connected.

The idea of employing geophones at varying depths, though not for any particular array result was generally shown in the Babb U.S. Pat. No. 2,544,819 filed Aug. 29, 1947. Here spaced marine geophones (i.e., hydrophones) were automatically located parallel to the mudline and since ordinarily mudlines are not at constant elevation, these geophones would be located at various vertical distances.

Picou taught a method of eliminating waves which emerge at an angle greater than a predetermined critical angle in U.S. Pat. No. 3,142,815 filed July 14, 1959. The received signals were divided into their spectral components, the components modified according to the relative position of the geophones, the speed of the wave, the frequency of the component, and the size of the critical angle, after which the components were stacked (composited additively). C. W. Kerns in U.S. Pat. No. 3,335,401 filed Jan. 7, 1966, taught filtering of noise by use of a special seismometer group whose additive output forms a trace of the resultant record. Geophones in each group were placed at about approximately a constant depth in water and have a predetermined sensitivity depending upon their position in the group. This could be called a weighted array. The weighting function, or relative sensitivity of the geophones in the group, is directly proportional to $$(\sin \pi x)/(\pi x)$$

between $x = \pm 1/k_1$; $k_1$ being the maximum wave number of the desired reflection signal and x the distance from center of the group. Two methods were taught for arranging this spread or array. In one, the geophone sensitivity itself was chosen to be essentially equal to the weighting function, and in the other the number of units (constant sensitivity) per unit length along the spread was adjusted to this value.

R. L. Sengbush in U.S. Pat. No. 3,350,683 filed Mar. 8, 1966, attempted to reduce the multiples of a reflection (reverberations between the surface of the water and the mudline) in marine seismic surveying by specially locating the horizontal streamer of geophones at a predetermined depth.

B. F. Giles in U.S. Pat. No. 3,491,848 (filed Jan. 10, 1968) minimized horizontal waves compared to generally upward coming vertical reflections by using a plurality of horizontal but areally spaced geophone streamers and preferably by putting vertically differently spaced seismic sources at odd multiples of a quarter wavelength of a fundamental source frequency. These sources were energized simultaneously.

J. C. Gray taught directing energy essentially vertically down and receiving selectively vertically up-coming waves in U.S. Pat. No. 3,572,462 filed Jan. 7, 1969. In his arrangement the seismic source or the receiver was covered by a dome-shaped cover which acoustically attenuated wave energy in directions other than a desired cone angle. (One practical difficulty with this particular arrangement is, of course, the fact that it is ordinarily extremely difficult to obtain in a physically realizable dome of limited wall thickness the desired seismic attenuation against unwanted waves).

Burg and Schneider, in U.S. Pat. No. 3,284,763, filed Oct. 30, 1962, contemplated applying a linear, time invariant frequency-dependent type of data processing to reproducible records from multichannel seismic data. This is another example of record processing to enhance the ultimate record, by synthesizing a velocity filter applicable separately to each of a plurality of traces which have been reproducibly recorded, which passes a desired signal of one apparent velocity on reception, at the same time suppressing (rejecting) undesired signals of different apparent velocity.

N. R. Harris in U.S. Pat. No. 3,381,266 (filed Sept. 27, 1975) disclosed a method for compositing seismic traces obtained with multiple coverage field techniques, obtaining traces with the same shot-to-detector distances but representing horizontally spaced subsurface reflecting points. These traces are composited (as in a computer) to produce output signals in which primary and multiple reflections are additive while random noise is essentially out of phase and tends to cancel.

C. W. Frazier et al., in U.S. Pat. No. 3,564,494 (filed Sept. 27, 1966) described essentially the same technique disclosed in the Treitel, Shanks, and Frazier article in Geophysics already discussed. This is another type of record processing from reproducible traces involving a type of fan filter algorithm.

Saunders in U.S. Pat. No. 3,893,066 (filed Feb. 25, 1974) adjusted the output of each geophone of a spread or array to correct for differences in the seismic energy received by the geophones. Basically, the noise signal level for each geophone is compared and the geophone relative output adjusted in accordance with the ratio of the magnitude of the noise signal level from that geophone compared to the reference signal level, so that compensation has been made for variations in output due to changes in the character of the earth near the individual geophones.

A. L. Parrack in U.S. Pat. No. 3,979,713 (filed Aug. 19, 1974), taught using a dual spread of hydrophones in marine prospecting. The hydrophones are mounted in cables (streamers) and the streamers are maintained essentially horizontally but at two different vertical spacings from the surface. Signals received at one spread are subtracted from the corresponding signals received at the other to minimize horizontally traveling seismic waves. In the associated Parrack U.S. Pat. No. 3,952,281 filed June 10, 1974, the same spreads are used but the signals on the upper line are time-delayed before they are algebraically combined with the corresponding signals on the second, lower spread. This eliminates the effect of down-going waves reflected from the water-air interface at the surface.

V. S. Balderston in U.S. Pat. No. 3,943,484 filed Nov. 26, 1973, taught placing the explosive source and the horizontal streamers of hydrophones in a marine prospecting arrangement at such a midpoint between the water surface and the mudline that the traveltime of waves from the source to the receiver reflected from the water floor is essentially equal to the traveltime of such waves reflected from the surface, tending to cause cancellation of such unwanted wave effects.

A different situation is found in R. A. Broding's U.S. Pat. No. 3,252,541 filed Nov. 19. 1962, which permits determining the source of an earthquake by receiving seismic events at a plurality of geophones located at varying depths in a plurality of wells in the ground areally spaced from each other, then processing the resultant signals to produce a three-dimensional indication of the arrival direction of the seismic waves.

A number of patents have disclosed the use of seismic sources located at differing depths. The Giles patent has already been referred to. N. D. Smith, Jr., in U.S. Pat. No. 3,256,501 filed June 6, 1960, uses a linear explosive seismic source in marine seismic surveying, which source may be detonated from one end or simultaneously from a plurality of points within the line. His FIG. 15 shows a tilted linear source which is energized from the top so that separate excitation of seismic wave sources occurs at progressively greater depths as time increases. He teaches that such a source can be employed to simulate matching the velocity of the down-going seismic waves to that of the immersing liquid, which minimizes the pulse of energy upgoing from the source to the surface and reflected back down as a subsequent pulse. Alternatively, he teaches placing a plurality of point charges along a tilted line and detonating these in sequence at such times that the various initiations match the seismic velocity in the surrounding liquid.

L. G. Kilmer et al,. in U.S. Pat. No. 3,331,050 filed Apr. 16, 1965, taught using multiple sources of a cyclically generated impulse in marine prospecting. The top source of these multiple sources was spaced a quarter wavelength from the surface and the others were spaced at integral multiples of a half wave below this top source. The timing chosen was such that the lag between successively deeper source initiations are just equal to the traveltime of the upper impulse down to the source in question. This speed matching is, therefore, of the same type taught in the Smith reference above.

G. A. Rusnak in U.S. Pat. No. 3,479,638 filed July 29, 1968, teaches increasing the source strength and resolution in marine seismic surveying using impulsive-type sources, by using a plurality of such sources spaced vertically at integral multiples of a half wave of the desired frequency.

SUMMARY OF THE INVENTION

It is an object of the present invention to provide a new and improved method of seismic exploration which emphasizes the reception of seismic waves of all frequencies within specified, predetermined incident angles, with high attenuation (or low receptor sensitivity) to seismic waves traveling in other directions.

This is accomplished in one embodiment of my invention by providing a novel hydrophone array for each recorded trace in which the hydrophones are vertically and horizontally spaced to provide reception at essentially contant sensitivity up to a desired angle for received waves at all frequencies, and at very high attenuation at other angles. In another embodiment of the invention, a conventional spread of hydrophones or geophones is employed with a novel array of vertically and horizontally spaced seismic sources, the strength of the sources being specially chosen and the initiation time arranged so that radiation is essentially within a predetermined angle for all frequencies.

Accordingly, a reception pattern (in the first place) or a radiation pattern (in the second case) is produced which is very directional, resulting in elimination or at least minimization of reception of reflected seismic waves except for those lying within the predetermined "fan" or cone angle. The geometry of the array may be adjusted depending upon the particular survey being carried out. Since in either embodiment described, there is both horizontal and vertical separation between adjacent units in the array, it can be seen that such an arrangement may be carried out more easily when surveying over water-covered areas than when planting explosives or geophones at varying spaced positions in a solid medium.

The geometry of the array to be adjusted permits obtaining high attenuation of seismic waves arriving at greater angles than those determined by the array (that is, greater than the fan angle) even though the longest wavelength of interest in these waves is considerably greater than the maximum dimension of the array. If the angle of inclination of a wavefront on the design axis determined by the array of hydrophones (or seismic sources) is $\alpha$, there is a predetermined array design parameter in the nature of an angle $\beta$, and the criteria for production of a useful output using the array is:

$$\tan \beta \tan \alpha = 1$$

or, $$\alpha = \tan^{-1} \cot \beta$$

When $\alpha$ exceeds this value, the wave arriving at such angle of inclination $\alpha$ essentially produces no output signal.

BRIEF DESCRIPTION OF THE DRAWINGS

The attached drawings illustrate the operation of this invention and advantages that may be gained from its use in seismic prospecting. The drawings form a part of the specification and are to be read in accordance with it.

DETAILED DESCRIPTION

Recently there has been considerable interest in seismic processing systems which allow the operator to filter seismograms selectively in such a way that has substantially the same effect for all seismic frequencies, and that events the moveouts of which per trace lie within a desired range of values are passed, i.e., are represented in the output, while events occuring outside this moveout range are generally considerably suppressed. One type of record processing technique which accomplishes this was mentioned above: the "fan" or "velocity" filters discussed by Fail and Grau, and by Embree et al. in 1963, and published in 1964. The use of fan filters has appeared effective in reducing undesirable noise, increasing the recorded band width of seismic reflection data, and improving the quality and continuity of reflected signals when compared to conventional linear or tapered arrays.

Figure 1:
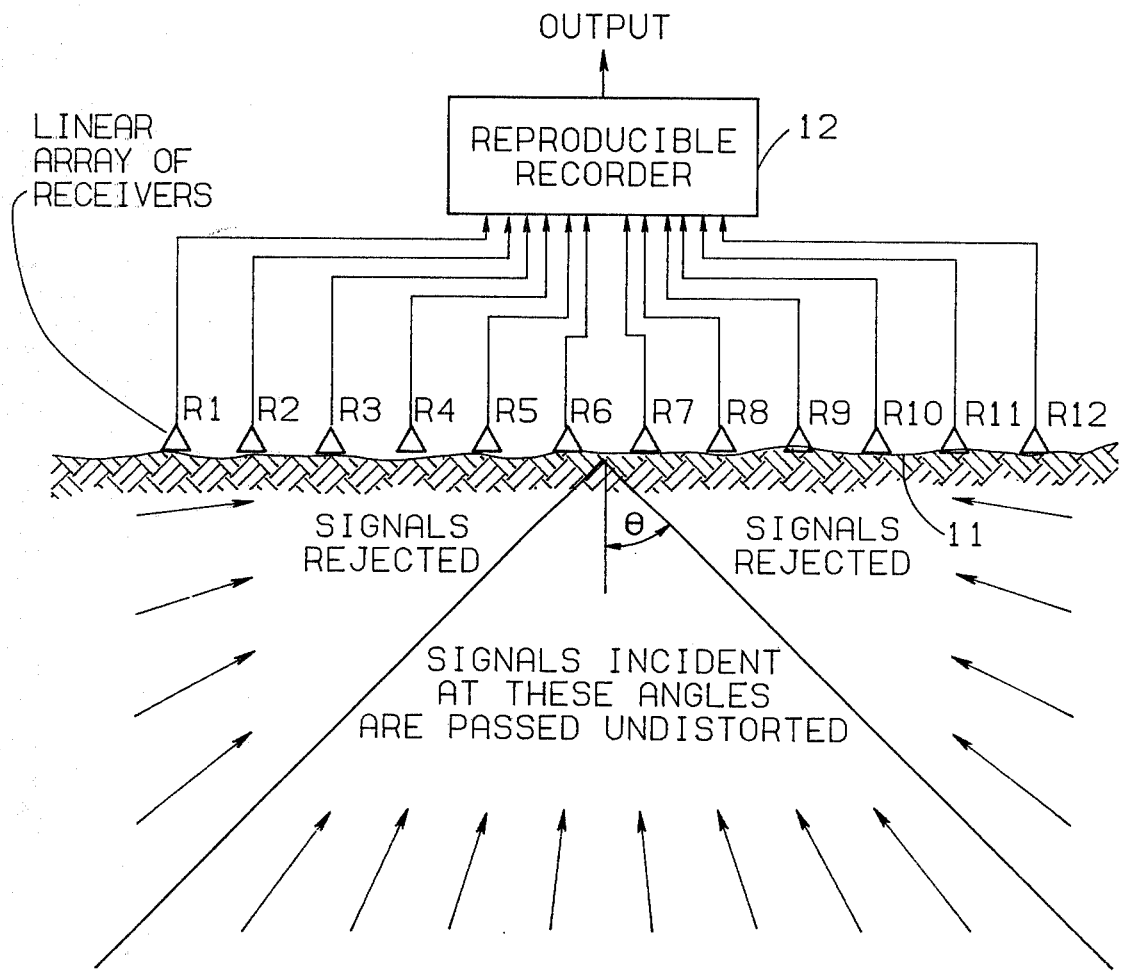
FIG. 1 is a diagramatic representation of a receiver array, or group of geophones, the output of which can be arranged for record processing in accordance with the principles of fan filtering.
Figure 2:
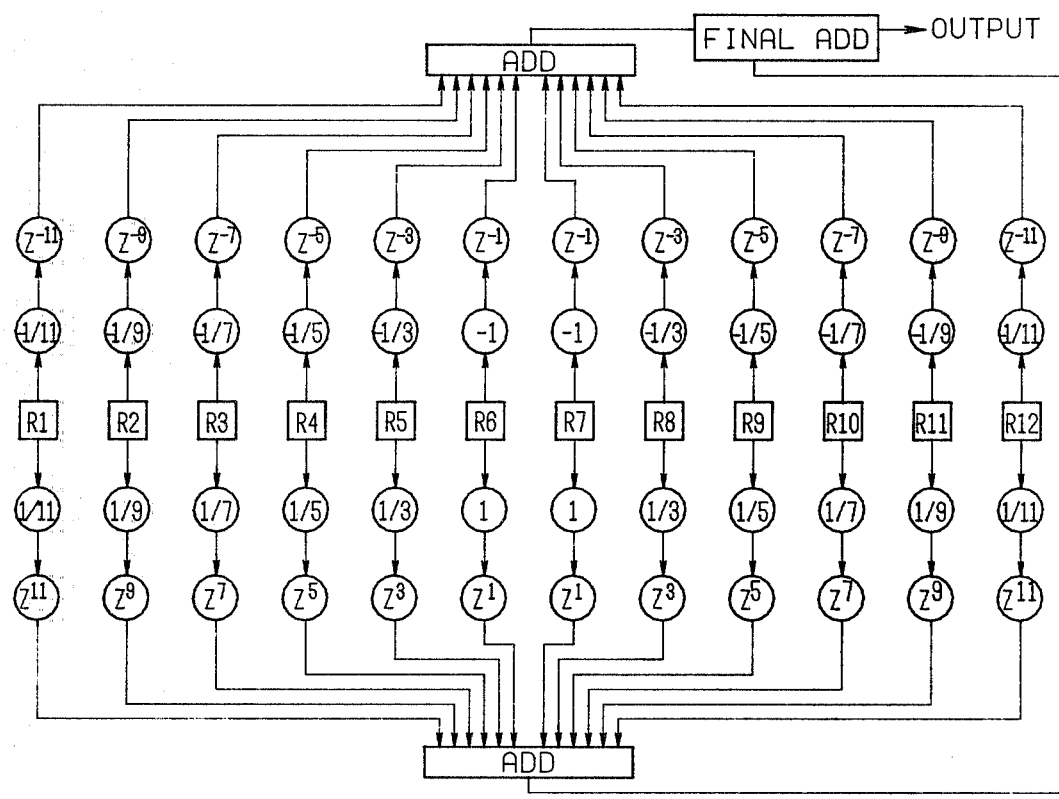
FIG. 2 is a schematic diagram of the signal processing steps required by the fan filter algorithm.

The general principle lying behind such record processing schemes are relatively well known. Broadly speaking, signals which arrive at a geophone group, such as, for example, the group of 12 geophones $R1$ to $R12$ in FIG. 1 are temporarily reproducibly recorded and subsequently the traces are digitized, adjusted in amplitude and phase relationship, and re-recorded. One such scheme for accomplishing this, in accordance with the teachings of Treitel et al, in Geophysics (Oct., 1967) is given schematically in FIG. 2. The output of the respective hydrophones (commencing with those at the center of the group, namely hydrophones $R6$ and $R7$) are multiplied by the sensitivity factor N which varies inversely with the distance of the hydrophone from the center of the group, the phase adjusted (that is, the polarity allowed to be either direct or reversed), after which a time lag $Z^{-m}$ or a time advance $Z^{+m}$ is applied and the resultant signals are all summed as shown in FIG. 2. The delay (or advance) is $m\Delta t/2$ time units where the time increment $\Delta t$ is chosen to produce the desired fan angle in the manner taught by the published papers. This produces an output which is characterized by the fact (refer to FIG. 1) that all signals of all frequencies incident at an angle up to the angle $\theta$ shown are passed at essentially constant sensitivity while those arriving at incident angles greater than $\theta$ are rejected by a factor which, in the case of the 12 unit geophone group shown in FIG. 1, amounts to at least 20 db.

In spite of the fact that fan filtering has been employed commercially since early in the 1960's, it has always involved the use of extensive record processing technqiues employing wide band, large scale computers.

It has of course also been known to employ conventionally various source arrays of hydrophones or geophones which have frequency dependent sensitivity patterns, without the use of record processing. This has been discussed above in the section dealing with the background of this invention. It is found that when employing such arrays the sensitivity or response pattern has undesirable side lobes in the pattern for each frequency component. Also, the linear dimensions for conventional arrays must necessarily be greater than the longest wave length of interest.

I have now found that it is possible to arrange a two-dimensional areal array of geophones essentially in a vertical plane which provides automatically for the fan filtering of reflecting waves within a design half angle $\theta$ (as shown in FIG. 1) and which as a result provides an identical pattern for all frequencies.

It eliminates the undesirable side lobes such that the radiation or sensitivity pattern has unit response within the fan-shaped region and highly attenuated response exterior to this region.

The angle $\theta$ of the fan-shaped, all-pass radiation pattern can be increased or decreased by a simple adjustment of the geometry of the array.

The linear dimension of the array can be considerably smaller than the longest wave length of interest.

This novel receiver array is discussed in a marine situation by referring first to the arrival of a series of seismic waves at a single hydrophone in an infinite marine medium. It will be seen that certain propagation times for this novel arrangement provide certain delays required by the above general principles of fan filtering. Then a complete array resulting from this embodiment is shown for use in a marine surveying environment. Precisely the same principles govern the choice of an array used in land prospecting, but in this case the array hydrophones would ordinarily be placed at suitable depths in a plurality of wells drilled into the surface layer of the earth). After this, the use of the source-receiver reciprocity theorem for acoustic systems is involved to illustrate that the description already given for a receiver geophone fan filter is equivalent to that for a specially designed source array useful in geophysical prospecting.

Referring again to FIG. 1, the individual geophones R1 to R12 are shown located essentially at the surface of the earth 11. The outputs of the geophones in the group, suitably amplified as is well known in this art, are recorded on the reproducible recorder 12 so that these may subsequently be processed using the fan filter algorithm shown schematically in FIG. 2. In FIG. 2 one sees that signal output from a particular geophone, say R4 in the fan filter algorithm, must be reproduced twice, once with a sensitivity of 1/5 (because of its distance from the center of the group) and once with a sensitivity of $-1/5$. Then the positive signal at relative sensitivity 1/5 is time advanced by $$(5(\Delta T)/2)$$

time units. The same signal output from this particular geophone R4 after phase reversal and sensitivity adjustment to 1/5 is time delayed by the same amount of time $(5/2)\Delta t$. Exactly the same type of processing occurs with each of the other geophone signals in the group. The sensitivity adjustment and time advance or delay depends upon the position of the seismometer in the group as shown in schematic form in FIG. 2. In passing, the time $\Delta t$ in the arrangement shown diagrammatically in FIG. 1 is related to the fan angle as discussed by Embree et al. in 1963. Incidentally, it is understood in fan filtering that another step conventionally follows the summing shown in FIG. 2, namely the use of a so-called Hilbert transformation, which shifts all signals by exactly a phase angle of 90°. The Hilbert transformation can be accomplished with additional hardware or on a suitable digital computer.

Figure 3:
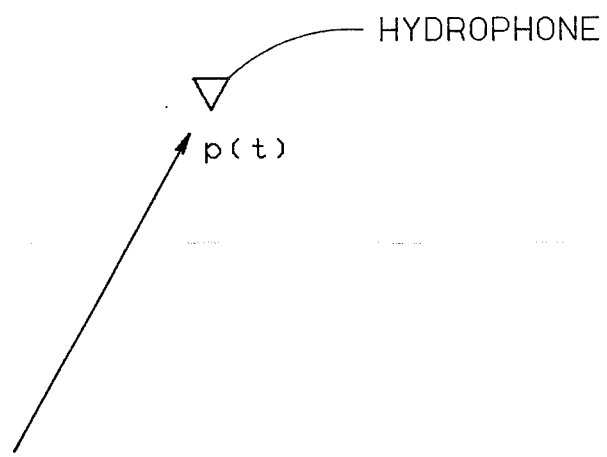
FIG. 3 illustrates the impinging of a seismic wave on a hydrophone in an infinite medium.
Figure 4:
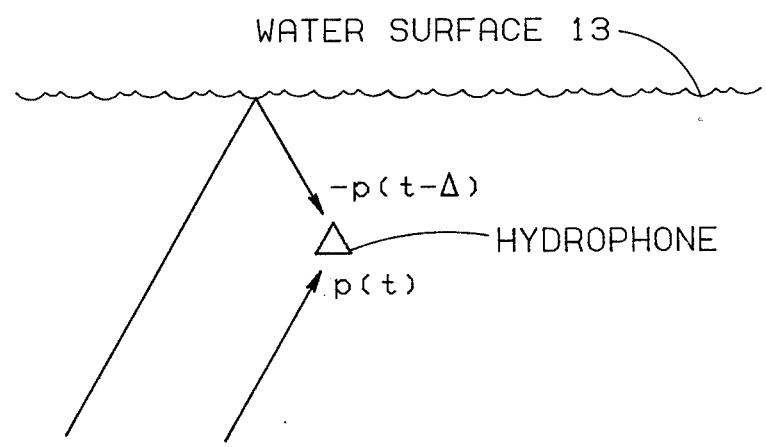
FIG. 4 is a corresponding diagram of the waves impinging on a hydrophone located near but below a water-air surface or interface.

Referring now to the marine surveying embodiment, if a hydrophone were present in a water medium the dimensions of which were essentially infinite, as shown diagramatically in FIG. 3, and this hydrophone be in the path of a set of seismic pressure waves p(t), this propagating pressure pulse causes a electrical output of the hydrophone which is the product of p(t) and the hydrophone sensitivity factor S. The output of the hydrophone would be S p(t). Of course in a practical circumstance, the hydrophone will be located near the water-air interface (water surface) 13. In this case, there will not only be a propagating pulse p(t) but in addition a pressure pulse reflected from the water surface 13. As is well known, this water signal pressure pulse on reflection will be inverted (equivalent to being multiplied by $-1$) and delayed a time $\Delta 0$ with respect to the incident pulse. This time amount $\Delta$ depends upon the propagation direction and propagation velocity of the incident pulse and the depth of the receiver. Thus, as shown in FIG. 4, the output signal of the hydrophone in the presence of the water surface 13 will be $S\ p(t) - S\ p(t - \Delta)$.

Figure 5:
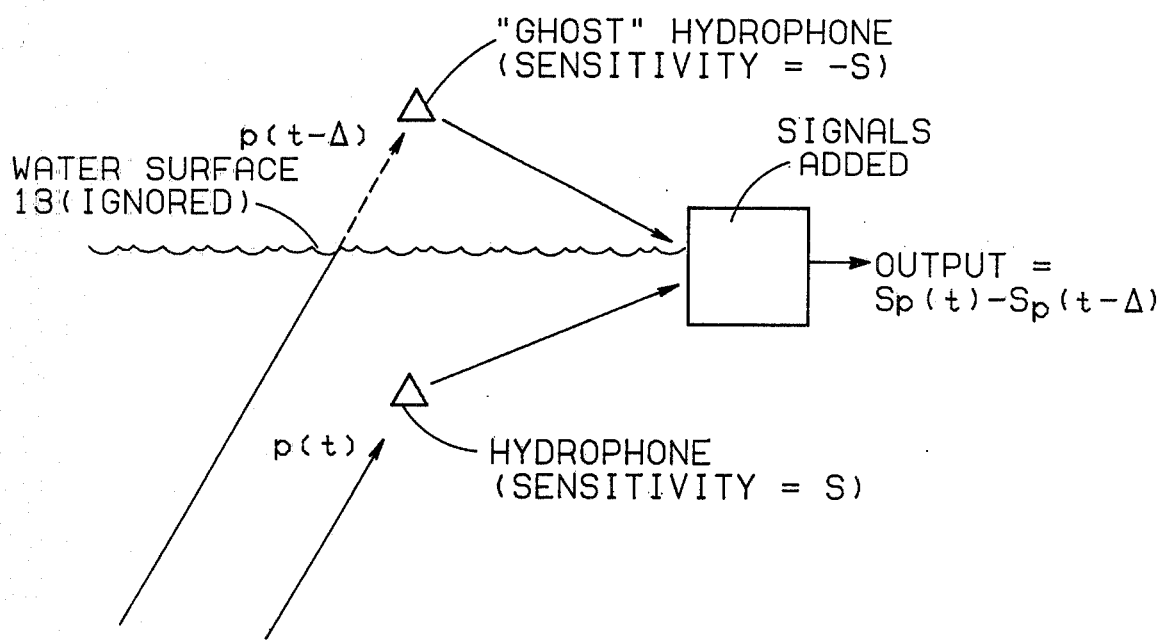
FIG. 5 shows in diagrammatic form the output of a single hydrophone located at a distance below the water-air surface including the effects of reflections from the interface.

Another instructive way of considering the effect of the water surface is to ignore the presence of the surface 13 and account for its effect by mentally locating a "ghost" hydrophone at the mirror image (through the surface 13) of the real hydrophone position. The water is now assumed to extend far beyond the surface and the "ghost" hydrophone is considered to have a sensitivity $-S$, which is equal to the negative of the sensitivity of the real hydrophone. Both hydrophone outputs are combined. Simple geometrical consideration then shows that the delay time $\Delta 0$ is the same whether calculated by the ray paths shown in FIG. 4 or those shown in FIG. 5.

It is therefore apparent that for an array of hydrophones below but near the water surface, one can account for the surface reflection by simply considering "ghost" hydrophones placed at the appropriate image points.

Figure 6:
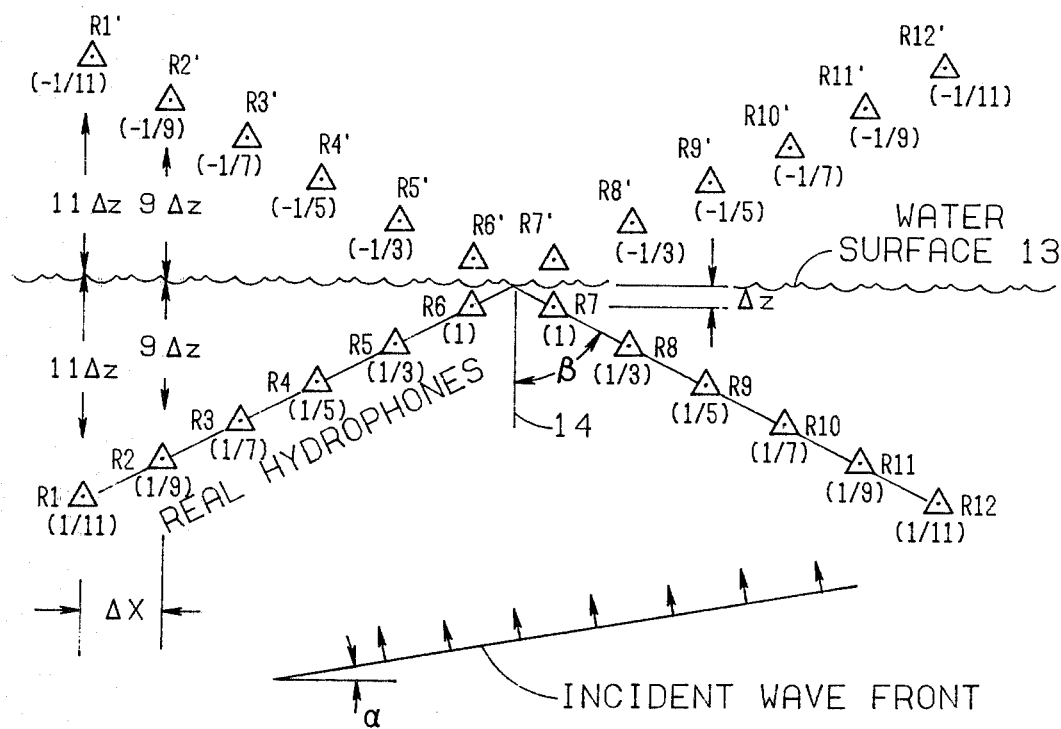
FIG. 6 illustrates one embodiment of my invention as applied to a group or array of hydrophones used in marine seismic prospecting.

FIG. 6 shows (beneath the water surface 13) an arrangement of hydrophones forming a hydrophone group in accordance with one embodiment of my invention. Here the hydrophones (symbols R1 to R12) lie essentially in a vertical plane in the water. The hydrophones actually are mounted on a vertical, light supporting structure (not shown) which floats at the upper end at the surface and hence locates all hydrophones in an array such as shown in FIG. 6. In the array shown, the real hydrophones are located a horizontal distance $\Delta x$ apart and are located at vertical distances below the surface of the water dependent upon the location of the respective hydrophone. Thus hydrophone R6 and R7 are each located a distance $\Delta z$ below the surface of the water. Hydrophones R5 and R8 are each located at a horizntal distance $3/2\ \Delta x$ from the midpoint between hydrophones R6 and R7 and at a vertical distance below the surface 3 times that of R6. This same ratio between horizontal and vertical distance is maintained for the other real hydrophones, that is all of them occur at positions essentially on two lines making an angle $\beta$ with respect to a verticl line 14 to the water surface 13.

Since the real hydrophones are separated by a horizontal distance of $\Delta x$ and a vertical distance of $2\Delta z$ (where $\Delta z$ is the depth of hydrophones R6 and R7) it follows that $$\tan\beta = (\Delta x)/(2\Delta z) \tag{1}$$

The output of all of these real hydrophones in such an array are electrically connected to sum up the output. The relative sensitivity of the hydrophones is arranged to be inversely proportional to the horizontal distance to the center of the spread.

Now consider a reflected wave with an incident wave front progressing upward at an angle $\alpha$ with respect to the horizontal, as shown in FIG. 6. Real hydrophone R12 is at a depth of $11\Delta z$ beneath the water surface, and the inclined wave front will arrive at hydrophone R12 at a relative time of $$t = (11\Delta z \cos\alpha)/V \tag{2}$$

ahead of the time that the same wave front strikes the surface of the water directly above R12. Here V is the pressure pulse progation velocity. The effect of the water surface can be considered as if the same wave front arrived at the ghost hydrophone R12' at a time t given by equation (2) after the same wave front crosses the water surface directly beneath R12'. Thus, the wave front at R12 is processed in two ways by this hydrophone configuration. First the relative sensitivity of hydrophone R12 being 1/11, there is an output of 1/11 p(t). This output will be advanced in time with the respect to arrival of p(t) at the ghost hydrophone R12'. Since outputs are electrically added, there is a contribution of 1/11 p(t) and after a time delay of 2 (11$\Delta z$ cos$\alpha$)/V a second contribution of $-1/11$ p(t). Similar statements hold for each of the remainder of the hydrophones shown in the array of FIG. 6.

It accordingly follows that the additive output of the hydrophone array (real hydrophones only) shown in FIG. 6 gives exactly the same output as that from the record processing steps of the fan filtering algorithm discussed in connection with FIGS. 1 and 2. Thus, if the wave front propagating at angle $\alpha$ with the horizontal is within the pass band of the corresponding fan-filter, it will produce an undistorted signal at the output of the combined hydrophone array. If the angle is too great, the signal will be rejected by the combined hydrophone array, and the output is highly attenuated.

This can be expressed in the form of an equation. The pass band is defined by angle $\theta$ of the fan filtering algorithm. $\theta$ is related to the parameters of the fan filter algorithm shown in FIG. 2 by the equation:

$$\frac{V}{\sin\theta} = \frac{\Delta x}{\Delta t} \tag{3}$$

The basic delay interval $\Delta t$ as defined essentially in FIG. 2 for the fan filter (or for my combined hydrophone array) is:

$$\frac{11\Delta z \cos\alpha}{V} = \frac{11\Delta t}{2} \quad \text{or,} \quad \Delta t = \frac{2\Delta z \cos\alpha}{V} \tag{4}$$

Combining equations (3) and (4) gives $$\frac{V}{\sin\theta} = \frac{\Delta x \, V}{2\Delta z \cos\alpha} \tag{5}$$
$$\text{or,}$$
$$\cos\alpha = \frac{\Delta x \sin\theta}{2\Delta z}$$

This Equation 5 shows the relation between the "effective" angular pass band, $\theta$, for the array shown in FIG. 6 as seen by a particular wave front incident upon the array at an angle $\alpha$ to the horizontal. If $\alpha$ is less than or at most equal to $\theta$, then the incident wave front will be passed by the array. If $\alpha$ exceeds $\theta$, the incident wave front will be rejected, just as in a record processing step using the fan filter algorithm there would be this rejection. Equation 5 shows that as $\alpha$ increases from 0, $\theta$ decreases from a value $\sin^{-1} (2\Delta z)/(\Delta x)$ Obviously at some certain point (which is the design parameter of the array) $\alpha$ and $\theta$ become equal. Any value of $\alpha$ beyond the point of equality is a definition of the reject region of the hydrophone array of FIG. 6. The solution of Equation 5 for the boundary value or design value of the array gives $$\tan\alpha_{pass} = \frac{2\Delta z}{\Delta x} \tag{6}$$

One can combine Equation (6) with Equation (1) to show the array design parameter or condition $\beta$, that is, $$\tan\beta \tan\alpha_{pass} = 1 \tag{7}$$

Accordingly, the array design angle $\beta$ and the pass region angle, $\alpha_{pass}$ are complementary angles. Lowering the ends of a hydrophone array of fixed length, which is equivalent to decreasing $\beta$, is equivalent to increasing the angular pass region of the array, and vice versa. Note that the array design places restriction only on the angles the two lines or arms of the real hydrophone array make with the vertical. Practical considerations limit the total number of hydrophones used in the array and the overall dimensions of the array. I have found that if as many as 8 geophones or more are used, such arrays can be made small, for examle, less than half as long as the maximum wave length of interest.

It is to be noted also that while in FIG. 6 the hydrophones are showns to be located at equal horizontal spacing $\Delta x$ throughout the array, this requirement is only for purposes of illustration. As long as the fan angle $\beta$ is maintained essentially constant, that is, as long as all of the hydrophones R1 to R12 of the group are located substantially at the slope angle $\beta$, the outpt of the geophone or hydrophone need only be essentially or substantially inversely proportional to the distance of the hydrophone from the center of the group. Anyone skilled in this particular art can quickly determine for himself that a variation in geophone position from the angle $\beta$ of the order of $\pm 10°$ will still yield an array with quite useful fan filtering properties. The maximum error in vertical distance (measured from the surface) should not exceed 10% of the nominal value for each geophone location.

As earlier mentioned, if this type of receptor array is to be employed on land, it is necessary to bury the respective hydrophones at the slope angle $\beta$ and arrange that the summed outputs involve individual hydrophone sensitivities which are inversely proportional to the distance from the center of the group to the hydrophone.

Figure 7:
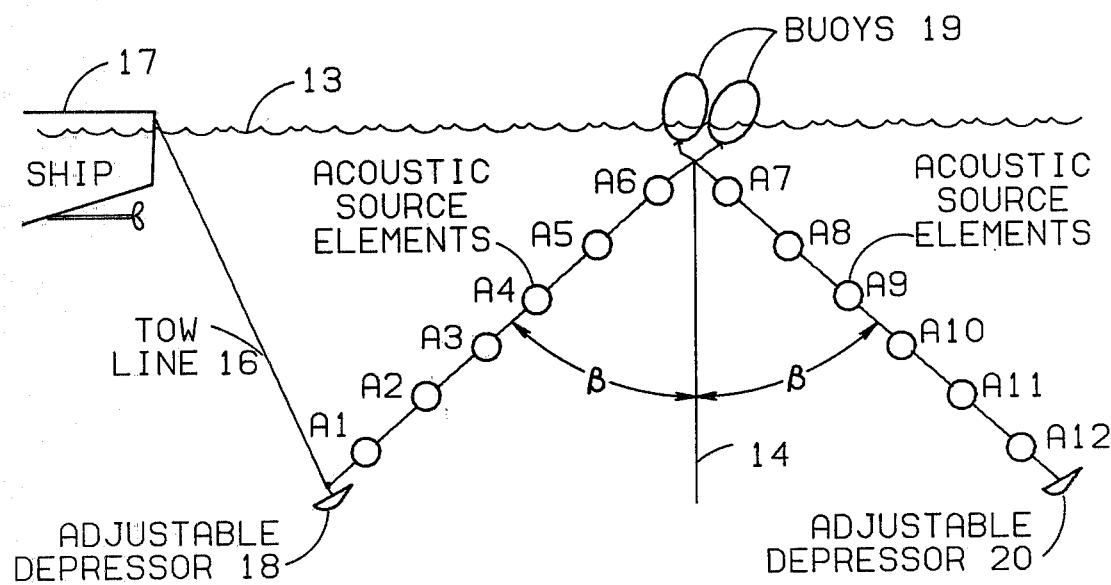
FIGS. 7 and 8 illustrate a seismic source employed in marine geophysical prospecting in accordance with a second embodiment of my invention.

There is well known to those skilled in this art an acoustic reciprocity theorem which states, for example, that the hydrophone array shown in FIG. 6 employed with any one or a combination of suitable seismic sources can be replaced by a geophone or geophones located essentially at the surface of the ground (or at a fixed level under it) using a combined source array geometrically the same as in FIG. 6, the elements of which have the same individual radiation strengths as the hydrophone sensitivities shown. The individual source elements in such a source array may be of any convenient type. Thus, for example, one can use a plurality of simultaneously detonated sparkers, or of airguns, sleeve exploders, waterguns, or the like. If one is doing marine exploration, such an array made up for example of sparkers an be towed by a single stress member, for example essentially as shown in FIG. 7 using a center buoy. It is perhaps more convenient to employ two stress members as in the arrangement shown in FIG. 8, with two center buoys.

In the arrangement shown in FIG. 7 the tow line 16 from the shooting ship 17 which actuates the acoustic source elements A1 to A12 is shown with means to maintain these elements at a halg angle $\beta 0$ with respect to the vertical 14 to the water surface 13. This adjustable paravane or depressor 18 is pulled by the towline 16 and the ship 17 to establish a suitable depth for the lower end of the individual elements of the array. At the center of the array are one or more buoys 19 which tend to keep the center of the acoustic source element array essentially at a predetermined desired depth below the surface 13. A second adjustble paravane or depressor 20 is located at the far end of the source array, which maintains the latter half of the array again at the desired half angle $\beta$. p In accordance with the reciprocity theorem, the individual strength of pressure pulse produced by the elements A1 to A12 should be inversely proportional to the horizontal distance from the individual elements to the center of the spread or array, that is the half way point between A6 and A7. It is already well known how to adjust amplitude of sparkers, gas guns and other source elements by suitable adjustment of the energy available to each source element A. Here again I would like to have each element as precisely as possible produce an output exactly inversely proportional to this distance, but for practical considerations it is sufficient if this be essentially accomplished by the overall group.

Figure 8:
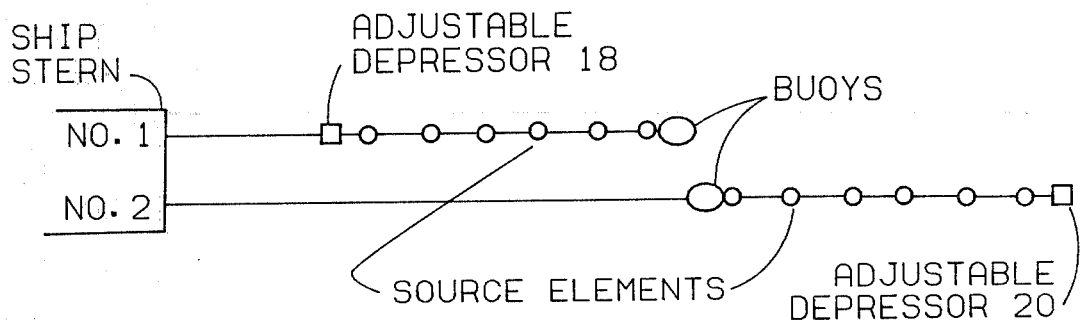
Figure 8:
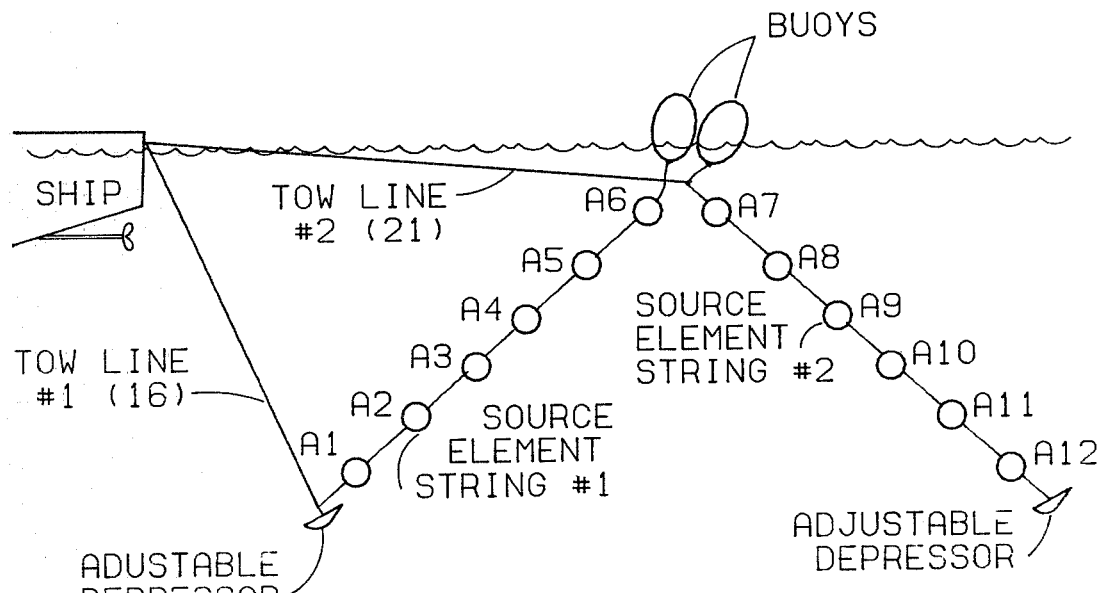

FIG. 8 shows in both plan and elevation an essentially equivalent arrangement of acoustic elements, but in this case two towlines 16 and 21 have been employed, each with an arrangement of half of the source elements and a single paravane or adjustable depressor 18 and 20.

In passing, it should be remarked that the variation of the pressure pulse radiated by the source array shown in FIG. 7 or FIG. 8 is the Hilbert transform of the pulse shape radiated by the individual elements A1 to A12.

Superficially, the array of geophones described here looks similar to that in the Blau U.S. Pat. No. 2,099,837. However, a more careful study shows more differences than similarities. Blau's arrangement of geophones is on the arc of a circle the center of which is the mirror image (about the one reflecting plane considered) of the actual shot point. The inventor's array of geophones uses linear positioning on two lines at angles $\beta 0$ to the vertical. Blau's arrangement is stated to be such that ". . . all reflections arrive at the detector or detectors simultaneously.", causing such reflections to be recorded sharply and direct waves to be reduced in effect. The inventor's array has no requirement of simultaneous arrival of any waves; all waves arriving at any inclination $\alpha$ are passed if equation (7) is satisfied and are highly attenuated if it is not satisfied. While Blau does not clearly state it, it is apparent his geophones are of substantially equal sensitivity; here the sensitivity is inversely proportional to the distance from the center of the spread. The same remarks apply to consideration of Blau's alternative array of shots and this inventor's array of seismic sources.

I claim:

1. In an array of hydrophones located below the surface of the earth, the individual outputs of which are additively connected, said array comprising a first plurality of hydrophones spaced substantially along a first straight line inclined at an angle $\beta$ to the vertical, and a second plurality of hydrophones spaced along a second straight line similarly inclined, said first and said second straight lines intersecting at or about the surface of the earth and defining substantially a vertical plane, the output sensitivity of each hydrophone in each of said pluralities being substantially inversely proportional to its distance from the intersection of said array, whereby the response or output of said array to seismic waves of equal amplitude arriving at various angles $\alpha$ to the horizontal is substantially the same for all frequencies until $\alpha = \tan^{-1} \cot \beta$ and is greatly attenuated for all frequencies at angles larger than this value.

2. The array of hydrophones in accordance with claim 1 in which said straight lines substantially intersect at the surface of the earth and the variation in angular position of any of said geophones from the straight line inclined at angle $\beta$ does not exceed $\pm 10°$.

3. The array of hydrophones in accordance with claim 2 in which each of said plurality of said second plurality of hydrophones includes at least 4 hydrophones, and spacing between adjacent hydrophones is substantially equal.

4. A directional array of seismic sources located below the surface of the earth, said array comprising a first plurality of one type of repeatable seismic sources spaced substantially along a first straight line inclined at an angle $\beta$ to the vertical, and a second plurality of said one type of seismic sources spaced along a second straight line similarly inclined, said first and second straight lines intersecting substantially at the surface of the earth and defining a substantially vertical plane, the output of each of said seismic sources in each of said pluralities being substantially inversely proportional to its distance from the center of said array, all of said sources being so arranged and connected that they may be actuated substantially simultaneously, whereby the output of said array produces seismic waves of substantially constant amplitude for all frequencies up to a maximum wavefront angle $\alpha$ with respect to the horizontal (where $\alpha = \tan^{-1} \cot \beta$) with a substantial reduction in the generated seismic wave amplitude occurring at all frequencies for angles in excess of said maxium wavefront angle.

5. A directional array of seismic sources in accordance with claim 4 in which the variation in angular position of any of said sources from the straight line inclined at angle $\beta$ does not exceed approximately $\pm 10°$.

6. A directional array of seismic sources in accordance with claim 5 in which each of said plurality and said second plurality of sources includes at least 4 sources, and the spacing between adajcent sources is substantially equal.

7. A method of seismic surveying comprising the steps of:
(A) arranging an array of hydrophones below the surface of the earth, the individual outputs of which are additively connected, said array comprising a first plurality of hydrophones spaced substantially along a first straight line inclined at an angle $\beta$ to the vertical, and a second plurality of hydrophones spaced along a second straight line similarly inclined, said first and said second straight lines intersecting at or about the surface of the earth and defining substantially a vertical plane, the output sensitivity of each of said pluralities being substantially inversely proportional to its distance to the center of said array, whereby the response or output of said array to seismic waves of equal amplitude arriving at various angles $\alpha$ to the horizontal is substantially the same for all frequencies until $\alpha = \tan^{-1} \cot \beta$ and is greatly attenuated for all frequencies at angles larger than this value;

(B) using said array of hydrophones for collecting seismic data.

8. A method for enhancing the directional production of seismic waves comprising the steps of:

(A) arranging a directional array of seismic sources below the surface of the earth, said array comprising a first plurality of one type of repeatable seismic sources spaced substantially along a first straight line inclined at an angle $\beta$ to the vertical and a second plurality of said one type of seismic sources spaced along a second straight line similarly inclined, said first and said second straight lines intersecting at or about the surface of the earth and defining a substantially vertical plane, the output of each of said seismic sources in each of said pluralities being substantially inversely proportional to its distance from the center of said array; and, (B) actuating said sources substantially simultaneously, whereby the output of said array produces seismic waves of substantially constant amplitude for all frequencies up to a maximum wavefront angle $\alpha$ with respect to the horizontal (where $\alpha = \tan^{-1} \cot \beta$) with a substantial reduction in the generated seismic wave amplitude occurring at all frequencies for angles in excess of said maximum wavefront angle.

* * * * *

UNITED STATES PATENT AND TRADEMARK OFFICE
CERTIFICATE OF CORRECTION

PATENT NO. : 4,254,480

DATED : March 3, 1981

INVENTOR(S) : William S. French

It is certified that error appears in the above—identified patent and that said Letters Patent is hereby corrected as shown below:

Column 5, line 5, "contant" should read --constant--.
Column 8, line 18, "$\Delta 0$" should read --$\Delta$--; line 34, "$\Delta 0$" should read --$\Delta$--; line 63, "verticl" should read -- vertical --.
Column 9, line 18, "progation" should read --propagation--.
Column 10, line 34, "examle" should read --example--; line 42, "outpt" should read --output--.
Column 11, line 16, "halg" should read --half--; line 16, "$\beta 0$" should read --$\beta$--; line 27, delete "p" following "angle $\beta$" and begin a new paragraph with "In accordance"; line 57, "$\beta 0$" should read --$\beta$--.
Column 13, line 7, Claim 7, after "each" and before "of" (second occurrence) insert --hydrophone in each--.

Signed and Sealed this

Seventh Day of June 1983

[SEAL]

Attest:

DONALD J. QUIGG

*Attesting Officer*     *Acting Commissioner of Patents and Trademarks*